(12) United States Patent
Hamada et al.

(10) Patent No.: US 12,392,521 B2
(45) Date of Patent: Aug. 19, 2025

(54) AIR CONDITIONING SYSTEM

(71) Applicants: Mitsubishi Electric Corporation, Tokyo (JP); MITSUBISHI ELECTRIC HYDRONICS & IT COOLING SYSTEMS S.P.A., Bassano del Grappa (IT)

(72) Inventors: Mamoru Hamada, Tokyo (JP); Hayato Horie, Tokyo (JP); Hidekazu Tani, Bassano del Grappa (IT); Guido Dacco, Bassano del Grappa (IT)

(73) Assignees: Mitsubishi Electric Corporation, Tokyo (JP); Mitsubishi Electric Hydronics & IT Cooling Systems S.p.A., Bassano del Grappa (IT)

( * ) Notice: Subject to any disclaimer, the term of this patent is extended or adjusted under 35 U.S.C. 154(b) by 255 days.

(21) Appl. No.: 17/794,813

(22) PCT Filed: Mar. 15, 2021

(86) PCT No.: PCT/JP2021/010395
§ 371 (c)(1),
(2) Date: Jul. 22, 2022

(87) PCT Pub. No.: WO2021/187423
PCT Pub. Date: Sep. 23, 2021

(65) Prior Publication Data
US 2023/0065130 A1  Mar. 2, 2023

(30) Foreign Application Priority Data
Mar. 16, 2020  (EP) ..................................... 20425012

(51) Int. Cl.
*F24F 11/84* (2018.01)
*F24D 3/18* (2006.01)
*F24F 11/85* (2018.01)

(52) U.S. Cl.
CPC ................. *F24F 11/84* (2018.01); *F24D 3/18* (2013.01); *F24F 11/85* (2018.01); *F24D 2220/042* (2013.01)

(58) Field of Classification Search
CPC ... F24F 11/84; F24F 11/85; F24D 3/18; F24D 2220/042; F24D 5/12; Y02B 30/12; Y02B 30/13; Y02B 30/70
See application file for complete search history.

(56) References Cited

U.S. PATENT DOCUMENTS 10,502,449 B2 * 12/2019 Kimura et al. .......... F24F 11/74
2009/0199581 A1 * 8/2009 Okada et al. .......... F25B 30/02
62/238.7

(Continued)

FOREIGN PATENT DOCUMENTS

CN  110081614 A   8/2019
JP  2011-242001 A  12/2011

(Continued)

OTHER PUBLICATIONS

JP 6610950 B2 Translation (Year: 2019).*

(Continued)

*Primary Examiner* — Jerry-Daryl Fletcher
*Assistant Examiner* — Dario Antonio Deleon
(74) *Attorney, Agent, or Firm* — Posz Law Group, PLC

(57) ABSTRACT

An air conditioning system includes: a heat source unit; an indoor unit; a water circuit configured by connecting a supply pipe and a return pipe; a flow rate adjusting valve provided in the water circuit; a supply air temperature control unit configured to adjust a flow rate of the flow rate adjusting valve; a pump provided in the water circuit; a pump controller configured to control a rotation speed of the pump; a return water temperature sensor; a supply water temperature sensor; a supply water temperature control unit;

(Continued)

and a target supply water temperature updating unit configured to change a target supply water temperature to which a supply water temperature detected by the supply water temperature sensor is to reach based on a temperature difference between a return water temperature detected by the return water temperature sensor and the supply water temperature.

2 Claims, 13 Drawing Sheets

(56) References Cited

U.S. PATENT DOCUMENTS

| | | | | |
|---|---|---|---|---|
| 2012/0029707 | A1* | 2/2012 | Dazai et al. | F24D 3/18 700/282 |
| 2012/0291468 | A1* | 11/2012 | Kato et al. | F24F 11/30 62/185 |
| 2018/0283756 | A1* | 10/2018 | Avila Chillida | Y02B 30/70 |
| 2021/0048200 | A1* | 2/2021 | Honjo et al. | Y02B 30/70 |

FOREIGN PATENT DOCUMENTS

| | | | | |
|---|---|---|---|---|
| JP | 2013-195047 | A | 9/2013 | |
| JP | 5977622 | B2 * | 8/2016 | F24F 11/02 |
| JP | 6610950 | B2 * | 11/2019 | Y02P 80/10 |
| WO | 2011/104827 | A1 | 9/2011 | |

OTHER PUBLICATIONS

JP 5977622 B2 Translation (Year: 2016).*
Office Action dated Dec. 21, 2023 issued for corresponding Chinese Patent Application No. 202180020279.8 (and English translation).
International Search Report of the International Searching Authority mailed Jun. 1, 2021 for the corresponding International application No. PCT/JP2021/010395 (and English translation).
Extended European Search Report mailed Sep. 22, 2020 for the corresponding international patent No. EP 20425012.0-1008.

* cited by examiner $\Delta Ta$ = RETURN AIR TEMPERATURE_Tar
− TARGET RETURN AIR TEMPERATURE_Tam STATE (a)

STATE (b)

AIR CONDITIONING SYSTEM

CROSS REFERENCE TO RELATED APPLICATIONS

This application is a U.S. national stage application of PCT/JP2021/010395 filed on Mar. 15, 2021, which claims priority to European application no. 20425012.0 filed on Mar. 16, 2020, the contents of which are incorporated herein by reference.

TECHNICAL FIELD

The present disclosure relates to an air conditioning system for cooling and heating by circulating cold or hot water into a room.

BACKGROUND ART

As is well known, in an air conditioning system using cold or hot water as a heat medium, air conditioning is performed by supplying cold or hot water whose temperature has been adjusted by a heat source unit to an indoor unit installed in an air-conditioned space by a pump.

In such an air-conditioning system, a power consumed by the heat source unit and the pump changes depending on a setting of a supply water temperature of the cold or hot water from the heat source unit to the indoor unit. For example, in the case of cooling, if a temperature of the cold water supplied by the heat source unit is further lowered, an operating efficiency (COP) of a refrigeration cycle decreases, so that the power consumed by the heat source unit increases. On the other hand, on the indoor unit side, if the temperature of the cold water is lowered, a required flow rate of water decreases, so that the power consumed by the pump is reduced. That is, there is a trade-off between the power consumption of the heat source unit and the power consumption of the pump with respect to the supply water temperature.

For example, in a Patent Literature 1, a method for setting a supply water temperature of the heat source unit so that a total power consumption of a power consumption of the heat source unit and a power consumption of the pump is minimized by detecting a supply air temperature of the indoor unit and the supply water temperature of the heat source unit and determining a correlation between a temperature difference of these temperatures and a water flow rate is determined in advance, is suggested.

CITATION LIST

Patent Literature

Patent Literature 1: Japanese Patent No. 5977622

SUMMARY OF INVENTION

Technical Problem

However, even in the above-mentioned prior art document, which aims at simplification of calculation of the supply water temperature so that the total power consumed by the heat source unit and the pump is minimized, test operation data under a wide range of operating conditions is required in order to determine the correlation between the temperature difference between the supply air temperature and the supply water temperature and the water flow rate in advance. A large calculation process is required to store the test operation data and arranging these data to obtain the correlation between the temperature difference and the water flow rate, which leads to high costs of a controller.

The present invention has been made to solve the above-mentioned problems, and provides an air-conditioning system capable of minimizing total power consumed by a heat source unit and a pump and suppressing increase in cost of the system.

Solution to Problem

According to one embodiment of the present disclosure, there is provided an air conditioning system comprising: a heat source unit capable of adjusting a cooling capacity or a heating capacity for generating cold or hot water; an indoor unit configured to exchange heat between sucked air and the cold or hot water and blow out the air; a water circuit configured by connecting a supply pipe and a return pipe so that the cold or hot water circulates to the heat source unit and the indoor unit; a flow rate adjusting valve provided in the water circuit and capable of adjusting a flow rate of the cold or hot water; a supply air temperature control unit configured to adjust a flow rate of the flow rate adjusting valve; a pump provided in the water circuit; of which rotation speed is adjustable; a pump controller configured to control the rotation speed of the pump; a return water temperature sensor configured to detect a temperature of the cold or hot water flowing through the return pipe; a supply water temperature sensor configured to detect a temperature of the cold or hot water flowing through the supply pipe; a supply water temperature control unit configured to adjust the cooling capacity or the heating capacity of the heat source unit so that the supply water temperature detected by the supply water temperature sensor becomes a target supply water temperature; and a target supply water temperature updating unit configured to change the target supply water temperature based on a temperature difference between the return water temperature detected by the return water temperature sensor and the supply water temperature.

Advantageous Effects of Invention

The air-conditioning system according to the present disclosure can minimize the total power consumed by the heat source unit and the pump by a simple calculation process for determining a target supply water temperature based on the temperature difference between the inlet and the outlet of the heat source unit, and therefore; the air conditioning system can suppress increase in cost of the system.

DESCRIPTION OF EMBODIMENTS

Hereinafter, the air conditioning system according to an embodiment will be described in detail with reference to the drawings.

Embodiment 1

Figure 1:
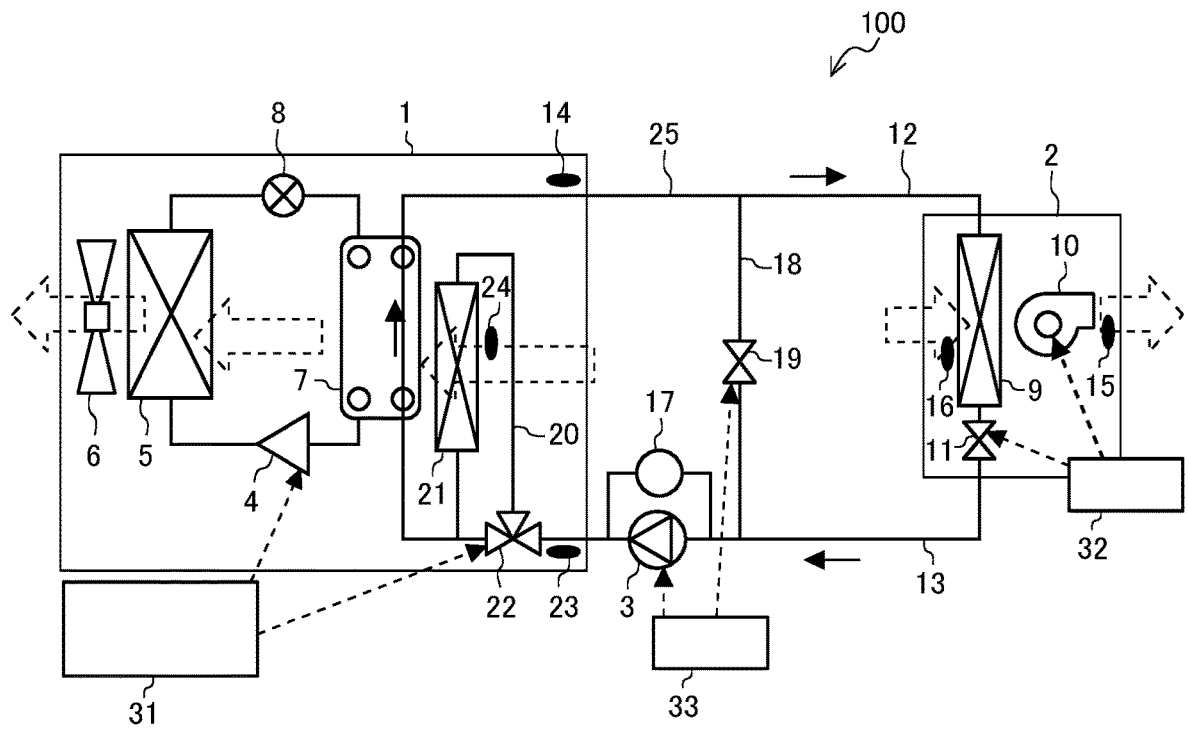
FIG. 1 is a schematic diagram of an air conditioning system according to Embodiment 1.

FIG. 1 is a schematic diagram of an air conditioning system according to Embodiment 1. As shown in FIG. 1, the air conditioning system 100 performs a cooling operation, and a heat source unit 1 which generates cold water, an indoor unit 2, and a pump 3 are connected by a supply pipe 12 and a return pipe 13, which are water pipes, to form a water circuit 25. The cold water, which is pressurized by the pump 3 and circulates in the water circuit 25, is cooled by the heat source unit 1, and then supplied to the indoor unit 2 through the supply pipe 12. The cold water supplied to the indoor unit 2 is heat-exchanged with indoor air, and then returned to the pump 3 through the return pipe 13.

The heat source unit 1 includes a refrigeration cycle, in which a compressor 4, a condenser 5, an expansion valve 8, and a refrigerant side of a refrigerant-water heat exchanger 7 are connected, a free cooling circuit 20, and a heat source unit controller 31. The compressor 4 is of a variable rotation speed type, and a cooling capacity is continuously adjustable. The free cooling circuit 20 is connected to a water side inlet of the refrigerant-water heat exchanger 7 via a three-way valve 22 which is a flow path switching device. The three-way valve 22 allows a selection whether water is supplied to a water-air heat exchanger 21 or not. An outdoor fan 6 blows outside air to the water-air heat exchanger 21 and the condenser 5 in this order.

Further, the heat source unit 1 includes a supply water temperature sensor 14 installed on an outlet side of the cold water, a return water temperature sensor 23 installed on an inlet side of the cold water, and an outside air temperature sensor 24 installed on a side of the water-air heat exchanger 21. A heat source unit controller 31 is a microcomputer including a processor, a memory, an I/O port, and other devices. The heat source unit controller 31 performs rotation speed control of the compressor 4 and flow control of the three-way valve 22 based on temperature information obtained from the supply water temperature sensor 14, the return water temperature sensor 23, and the outside air temperature sensor 24.

In the indoor unit 2, an indoor heat exchanger 9 and a two-way valve 11 are connected in series to the water circuit 25, and indoor air and the cold water flowing into the indoor heat exchanger 9 are heat-exchanged by an indoor fan 10. The two-way valve 11 is a flow rate adjusting valve of which opening degree is continuously adjustable to adjust flow rate of water flowing through the indoor unit 2.

An indoor unit controller 32 is a microcomputer including a processor, a memory, an I/O port, and other devices. The indoor unit controller 32 controls the indoor fan 10 and the two-way valve 11 based on temperature information obtained from a return air temperature sensor 16 installed on an intake port of the indoor air and a supply air temperature sensor 15 installed on an outlet port of the indoor air, and a return air temperature target value and a supply air temperature target value set by a user. The indoor unit controller 32 is a supply air temperature control unit configured to adjust a flow rate of the two-way valve 11. When a plurality of indoor units 2 are installed in parallel, each indoor unit 2 is provided with the indoor unit controller 32 to control the indoor fan 10 and the two-way valve 11.

The pump 3 is provided in the water circuit 25 which is configured by connecting the heat source unit 1, the supply pipe 12, the indoor unit 2, and the return pipe 13 in this order, and circulates the cold water. The water circuit 25 includes a bypass passage 18 having one end connected to the supply pipe 12 and the other end connected to the return pipe 13 on an inlet side of the pump 3. The bypass passage 18 can be opened and closed by a bypass valve 19. A pump controller 33 is a microcomputer including a processor, a memory, an I/O port, and other devices. The pump controller 33 performs rotation speed control of the pump 3 and opening and closing control of the bypass valve 19 so that the detected value of a differential pressure sensor 17 for detecting a differential pressure between an inlet and an outlet of the pump 3 becomes constant.

Next, control operation of the air conditioning system 100 according to the Embodiment 1 will be described. The heat source unit controller 31, the indoor unit controller 32, and the pump controller 33 may be separately installed or may be aggregated as a centralized controller.

Figure 2:
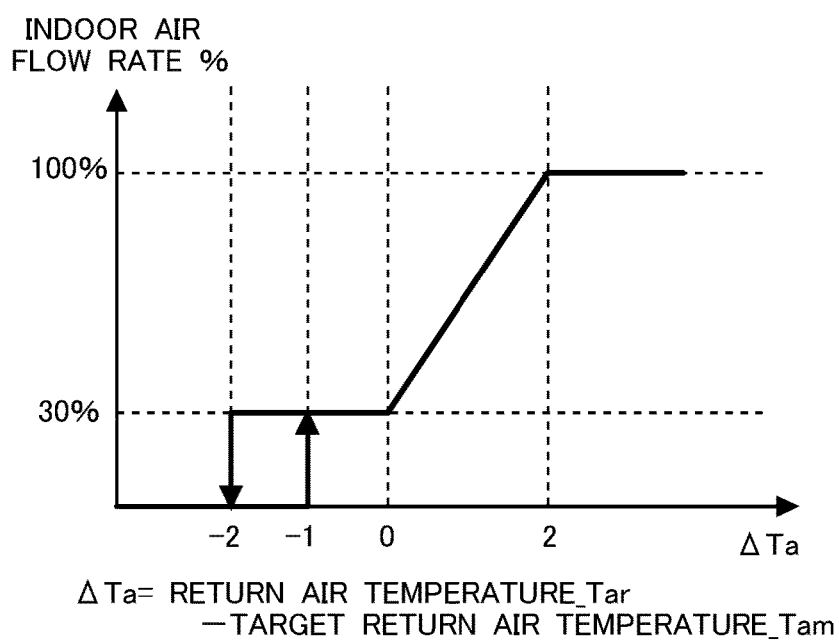
FIG. 2 is a diagram showing an example of indoor air flow rate control of the air conditioning system according to Embodiment 1.

First, air flow rate control of the indoor unit 2 will be described referring to FIG. 2. FIG. 2 is a diagram showing an example of an indoor air flow rate control with respect to a temperature difference $\Delta Ta$ between a return air temperature Tar detected by the return air temperature sensor 16 and a target return air temperature Tam. The indoor unit controller 32 calculates a temperature difference $\Delta Ta$ between the return air temperature Tar and the target return air temperature Tam, and controls the indoor fan 10 so as to have an air flow rate corresponding to the temperature difference $\Delta Ta$. As shown in FIG. 2, when the temperature difference $\Delta Ta$ is 2° C. or more, the indoor unit controller 32 sets an air flow rate of the indoor fan 10 to the maximum air flow rate of 100%, and when the temperature difference $\Delta Ta$ is 0° C. or less, the indoor unit controller 32 sets an air flow rate of the indoor fan 10 to the minimum air flow rate of 30%. When the temperature difference $\Delta Ta$ is between 0° C. and 2° C., an air flow rate control value is set so that the indoor air flow rate changes linearly from 30% to 100%. When the temperature difference $\Delta Ta$ becomes −2° C. or less, the indoor fan 10 is stopped and the cooling capacity is reduced to zero. After the indoor fan 10 stops and when the temperature difference $\Delta Ta$ becomes equal to or higher than −1° C., the indoor fan 10 is operated at the minimum air flow rate of 30%.

In Embodiment 1, the cooling capacity of the indoor unit 2 is controlled to be zero by stopping the indoor fan 10 when the return air temperature Tar is excessively lowered. However, the two-way valve 11 may be closed while keeping the indoor fan 10 in operation with the air flow rate of 30%.

Figure 3:
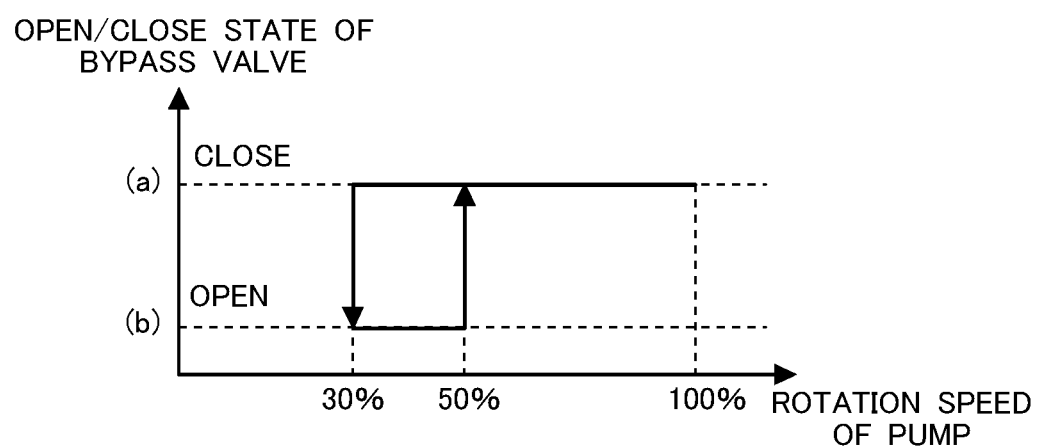
FIG. 3 is a diagram showing open/closed states of a bypass valve with respect to a rotation speed of a pump of the air-conditioning system according to Embodiment 1.
Figure 4:
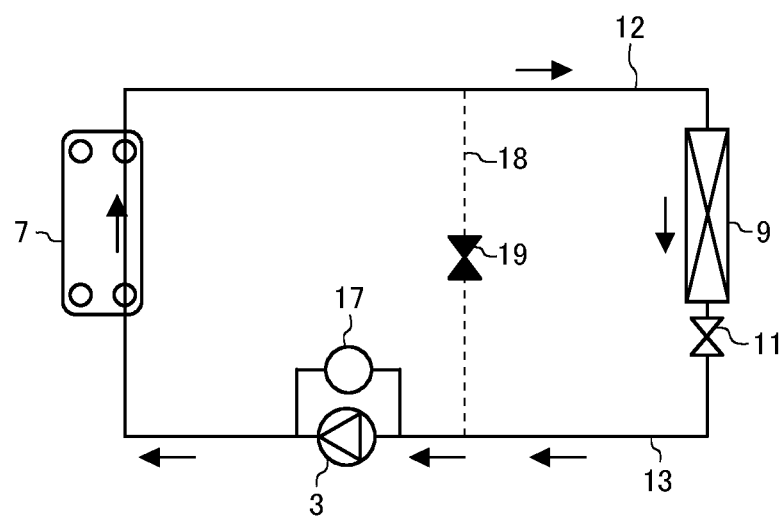
FIG. 4 is a diagram showing flow of cold water when the bypass valve is in closed state in the air conditioning system according to Embodiment 1.

Next, control operation of the pump controller 33 will be described referring to FIGS. 3, 4 and 5. FIG. 3 is a diagram showing open/closed states of the bypass valve 19 when a pump rotation speed is the minimum of 30% to the maximum of 100%. FIG. 4 is a diagram showing a flow of cold water when the bypass valve 19 is in a closed state, and FIG. 5 is a view showing a flow of cold water when the bypass valve 19 is in an open state.

In the pump controller 33, a target differential pressure $\Delta Pm$ of, for example, about 300 kPa is set in advance by the user. In an operation at start stage of the air conditioning system 100, the bypass valve 19 is closed as shown in FIG. 4, and all the cold water flowing through the supply pipe 12 flows to the indoor heat exchanger 9. The cold water reduced in pressure by passing through the two-way valve 11 returns to the pump 3 via the return pipe 13, and is pressurized again. The pump controller 33 controls the rotation speed of the pump 3 so that the differential pressure $\Delta P$ detected by the differential pressure sensor 17 becomes the target differential pressure $\Delta Pm$.

Figure 5:
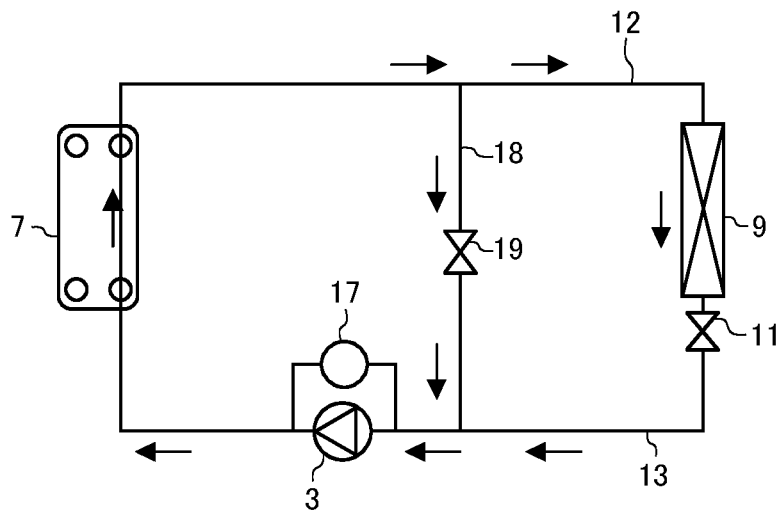
FIG. 5 is a diagram showing flow of cold water when the bypass valve is in open state in the air conditioning system according to Embodiment 1.

If the differential pressure $\Delta P$ exceeds the target differential pressure $\Delta Pm$ even if the rotation speed of the pump 3 reaches the minimum rotation speed, the pump controller 33 opens the bypass valve 19 as shown in FIG. 5. When the bypass valve 19 is opened, the cold water flowing through the supply pipe 12 is branched and flows through the indoor heat exchanger 9 and the bypass passage 18, so that the differential pressure $\Delta P$ is reduced. The pump controller 33 closes the bypass valve 19 when the rotation speed exceeds 50% due to the opening of the bypass valve 19.

Figure 6:
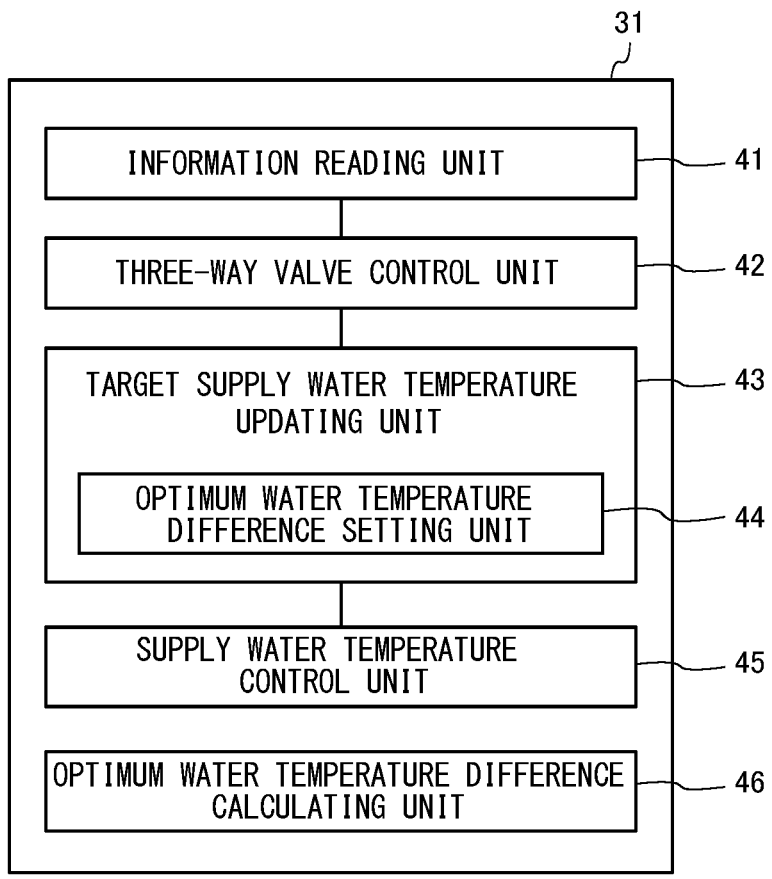
FIG. 6 is a block diagram showing an internal configuration of a heat source unit controller of the air-conditioning system according to Embodiment 1.

Next, control of the heat source unit 1 will be described. FIG. 6 is a block diagram showing an internal configuration of the heat source unit controller 31. The heat source unit controller 31 includes an information reading unit 41, a three-way valve control unit 42, a target supply water temperature updating unit 43, a supply water temperature control unit 45, and an optimum water temperature difference calculating unit 46. The target supply water temperature updating unit 43 includes an optimum water temperature difference setting unit 44. The information reading unit 41, the three-way valve control unit 42, the target supply water temperature updating unit 43, the optimum water temperature difference setting unit 44, the supply water temperature control unit 45, and the optimum water temperature difference calculating unit 46 are functional nodules implemented by executing a program stored in the memory by the heat source unit controller 31.

The information reading unit 41 successively obtains temperature information operation state of the three-way valve 22, and the open/close state of the bypass valve 19. The temperature information includes a supply water temperature Tws, a return water temperature Twr, and an outside air temperature Tout obtained from the supply water temperature sensor 14, the return water temperature sensor 23, and the outside air temperature sensor 24.

Figure 7:
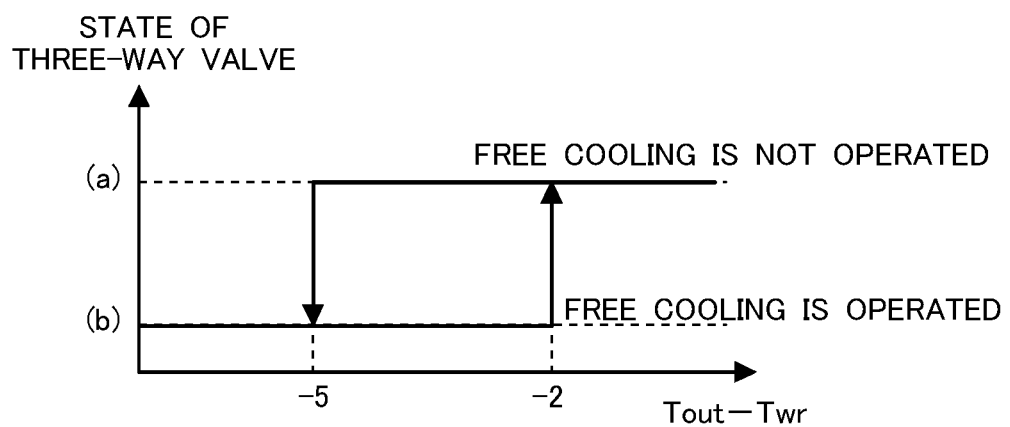
FIG. 7 is a diagram showing a control operation of a three-way valve with respect to a temperature difference between an outside air temperature and a return water temperature of the air conditioning system according to Embodiment 1.
Figure 8:
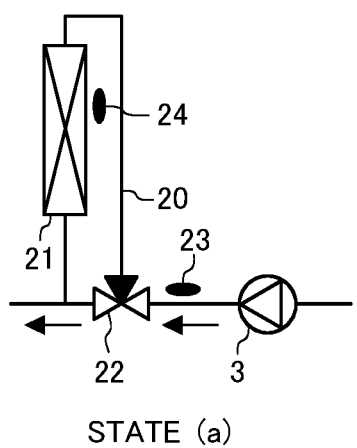
FIG. 8 is a diagram showing a state in which cold water does not flow into a water-air heat exchanger of the air conditioning system according to Embodiment 1.
Figure 9:
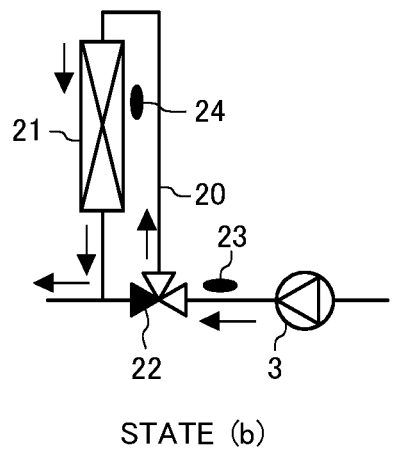
FIG. 9 is a diagram showing a state in which cold water flows into a water-air heat exchanger of the air conditioning system according to Embodiment 1.

Referring to FIGS. 7, 8 and 9, a control operation of the three-way valve control unit 42 will be described. FIG. 7 is a diagram showing the control operation of the three-way valve 22 with respect to a temperature difference between the outside air temperature Tout and the return water temperature Twr. FIG. 8 is a diagram showing a state (a) in which cold water does not flow into the water-air heat exchanger 21, and FIG. 9 is a diagram showing a state (b) in which cold water flows into the water-air heat exchanger 21.

The three-way valve control unit 42 acquires temperature information of the outside air temperature Tout and the return water temperature Twr from the information reading unit 41, and when the outside air temperature Tout is lower than the return water temperature Twr by 5° C. or more, the three-way valve 22 is controlled to be a state (b) shown in FIG. 9 so that water flows the free cooling circuit 20 (i.e., free cooling is operated). When the temperature difference between the outside air temperature Tout and the return water temperature Twr becomes larger than −2° C. during the water flows the free cooling circuit 20, the three-way valve control unit 42 switches the three-way valve 22 from the state (b) shown in FIG. 9 to the state (b) shown in FIG. 8 to stop the flow of the water in the free cooling circuit 20 (i.e., the free cooling is not operated). The three-way valve control unit 42 repeats the flow path switching control by the three-way valve 22 at a control interval of, for example, three minutes.

Figure 10:
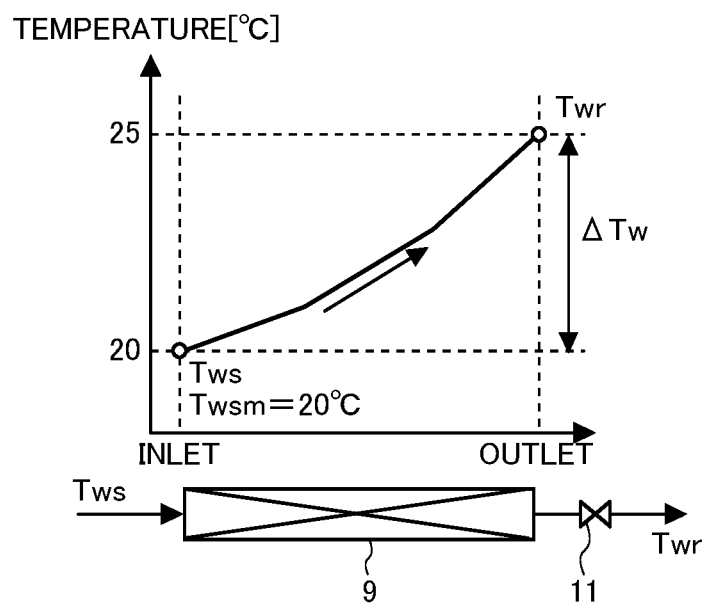
FIG. 10 is a schematic diagram showing a change in a water temperature in the indoor unit of the air conditioning system according to Embodiment 1.

FIG. 10 is a schematic diagram showing a change in a water temperature in the indoor heat exchanger 9. The horizontal axis represents a distance in a flow direction in which the cold water flows in the indoor heat exchanger 9, and a vertical axis represents a temperature of the cold water with respect to the distance. The cold water circulating in the water circuit 25 flows into the indoor heat exchanger 9 at the supply water temperature Tws, is heated to be the return water temperature Twr, and flows out of the indoor heat exchanger 9. At this time, a target supply water temperature Twsm is 20° C., and the supply water temperature Tws detected by the supply water temperature sensor 14 substantially matches the target supply water temperature Twsm by adjusting the cooling capacity of the heat source unit 1. The indoor unit controller 32 controls the supply air temperature Tas to be constant, and the pump controller 33 controls the differential pressure ΔP to substantially coincide with the target differential pressure ΔPm.

Figure 11:
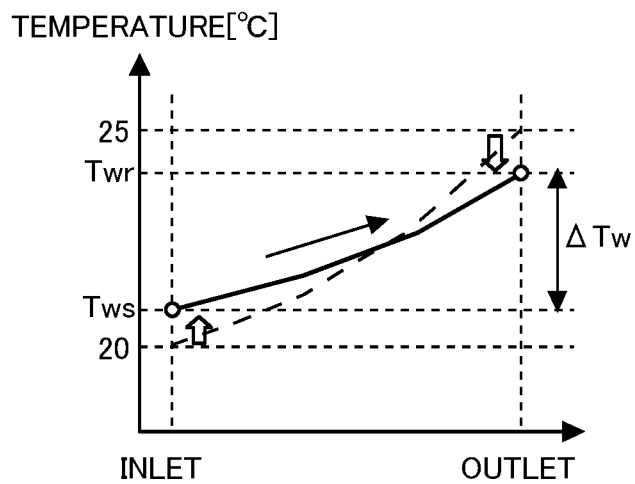
FIG. 11 is a state diagram showing a change of a return water temperature when a supply water temperature is increased from the state shown in FIG. 10.
Figure 12:
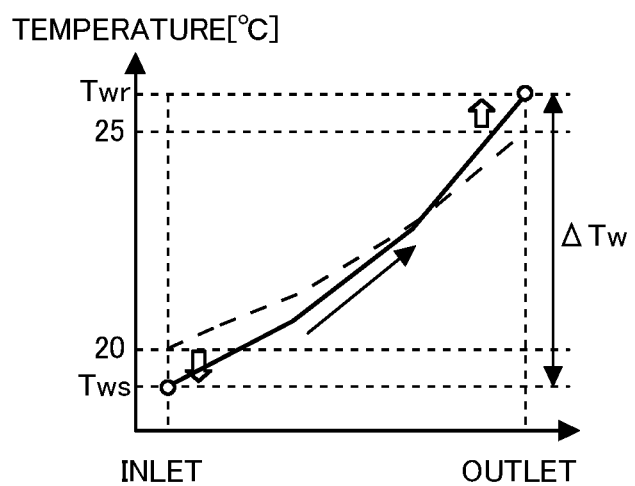
FIG. 12 is a state diagram showing a change of a return water temperature when a supply water temperature is decreased from the state shown in FIG. 10.

Next, referring to FIGS. 11 and 12, a response when the supply water temperature Tws is changed from the state shown in FIG. 10 will be explained. FIG. 11 is a state diagram showing a change of the return water temperature Twr when the supply water temperature Tws is increased from the state shown in FIG. 10, and FIG. 12 is a state diagram showing a change of the return water temperature Twr when the supply water temperature Tws is decreased from the state shown in FIG. 10.

When the supply water temperature Tws is increased from a stable condition, the supply air temperature Tas is first increased in the indoor unit 2, so that the opening degree of the two-way valve 11 is controlled to increase. Since the differential pressure ΔP decreases by the operation of the two-way valve 11, the pump controller 33 increases the rotation speed of the pump 3. The increase in the rotation speed of the pump 3 increases the flow rate of water circulating in the water circuit 25. However, the supply air temperature Tas of the indoor unit 2 is unchanged by the control of the two-way valve 11, so that the cooling capacity is also unchanged. As a result, the water temperature difference ΔTw becomes smaller by an increase in the flow rate of the water circulating in the water circuit 25 (see FIG. 11).

When the supply water temperature Tws is decreased, the opening degree of the two-way valve 11 is controlled to decrease in response to a decrease of the supply air temperature Tas of the indoor unit 2. The rotation speed of the pump 3 is controlled based on an increase of the differential pressure ΔP. As a result, the supply air temperature Tas and the differential pressure ΔP become equal to those before the supply water temperature is decreased, while the flow rate of the water circulating in the water circuit 25 decreases, and the water temperature difference ΔTw increases (see FIG. 12).

Figure 13:
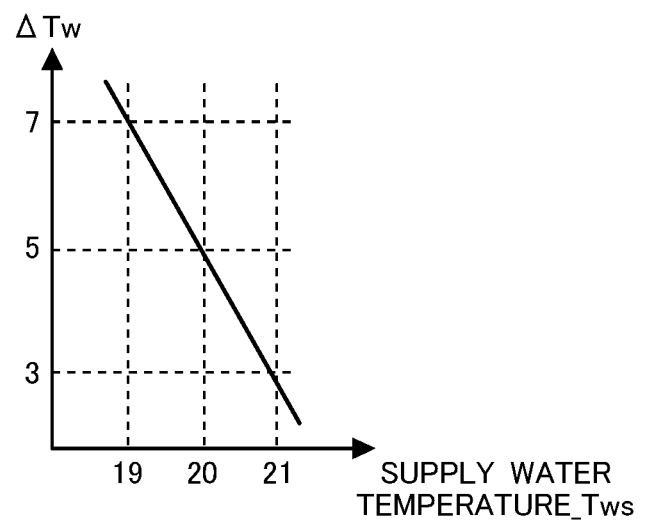
FIG. 13 is a graph showing an example of a relationship between the supply water temperature and the water temperature difference in the air-conditioning system according to Embodiment 1.

FIGS. 13 to 16 are graphs showing power consumption characteristics of the pump 3 and the compressor 4 with respect to the supply water temperature Tws or the water temperature difference ΔTw. FIG. 13 is a graph showing an example of a relationship between the supply water temperature Tws and the water temperature difference ΔTw. As shown in FIGS. 11 and 12, for example, in an operating condition in which the water temperature difference ΔTw becomes 5° C. when the supply water temperature Tws is 20° C., the water temperature difference ΔTw decreases by about 2° C. in response to increase of the supply water temperature Tws by 1° C., and the water temperature difference ΔTw increases by about 2° C. in response to decrease of the supply water temperature Tws by 1° C.

Figure 14:
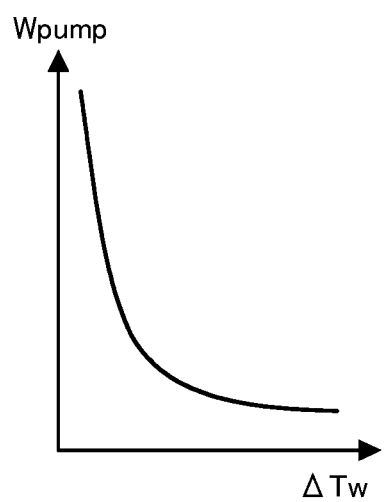
FIG. 14 is a graph showing a relation between the water temperature difference and a power consumption of the pump in the air-conditioning system according to Embodiment 1.

FIG. 14 is a graph showing a relation between the water temperature difference ΔTw and the power consumption Wpump of the pump 3. Since the pump 3 is controlled so that the differential pressure ΔP becomes constant, the power Wpump consumed by the pump 3 is proportional to flow rate Gw of the water circulating through the water circuit 25 (Wpump∝Gw). Since the two-way valve 11 is controlled so that the supply air temperature Tas of the indoor unit 2 becomes constant, the cooling capacity Qc of the indoor unit 2 does not change before and after the supply water temperature Tws is changed. Since the cooling capacity Qc is proportional to the product of the water temperature difference ΔTw and the water flow rate Gw, the water temperature difference ΔTw is inversely proportional to the water flow rate Gw, and is inversely proportional to the power consumption Wpump of the pump 3.

Figure 15:
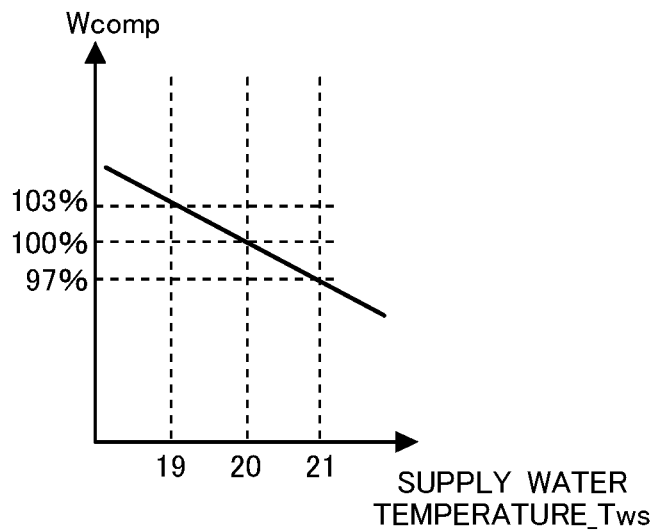
FIG. 15 is a graph showing a change characteristic of a power consumption of the heat source unit with respect to a change in the supply water temperature in the air-conditioning system according to Embodiment 1.

FIG. 15 is a graph showing a change characteristic of the power consumption Wcomp of the heat source unit 1 with respect to a change in the supply water temperature Tws. Generally, it is known that operating efficiency of the refrigeration cycle changes by about 3% with respect to a change in 1° C. of the operating pressure when converted in terms of the saturating temperature. Therefore, under a condition that the cooling capacity Qc is unchanged, the power consumption Wcomp of the heat source unit 1 also changes by about 3% with respect to a change in the supply water temperature of 1° C.

Figure 16:
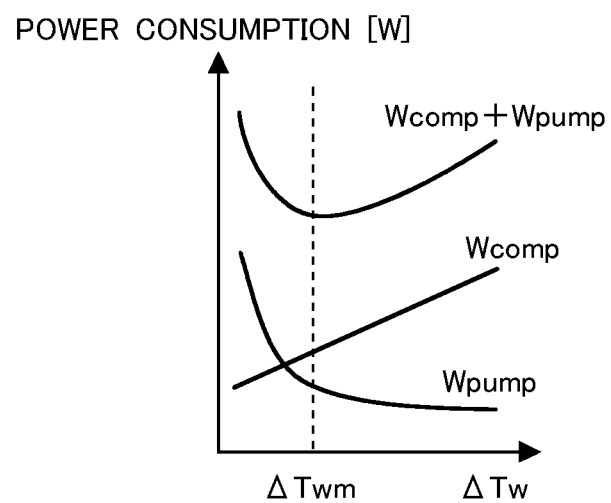
FIG. 16 is a graph showing a relation between the power consumption and the water temperature difference in the air-conditioning system according to Embodiment 1.

FIG. 16 is a graph showing a relation between the power consumption and the water temperature difference ΔTw. When the above relations are summarized, a sum of the power consumption Wpump of the pump 3 and the power consumption Wcomp of the heat source unit 1 has a downwardly convex property with respect to the water temperature difference ΔTw. That is, it can be seen that there is an optimum water temperature difference ΔTwm at which a total power consumption is minimized (see FIG. 16).

Figure 17:
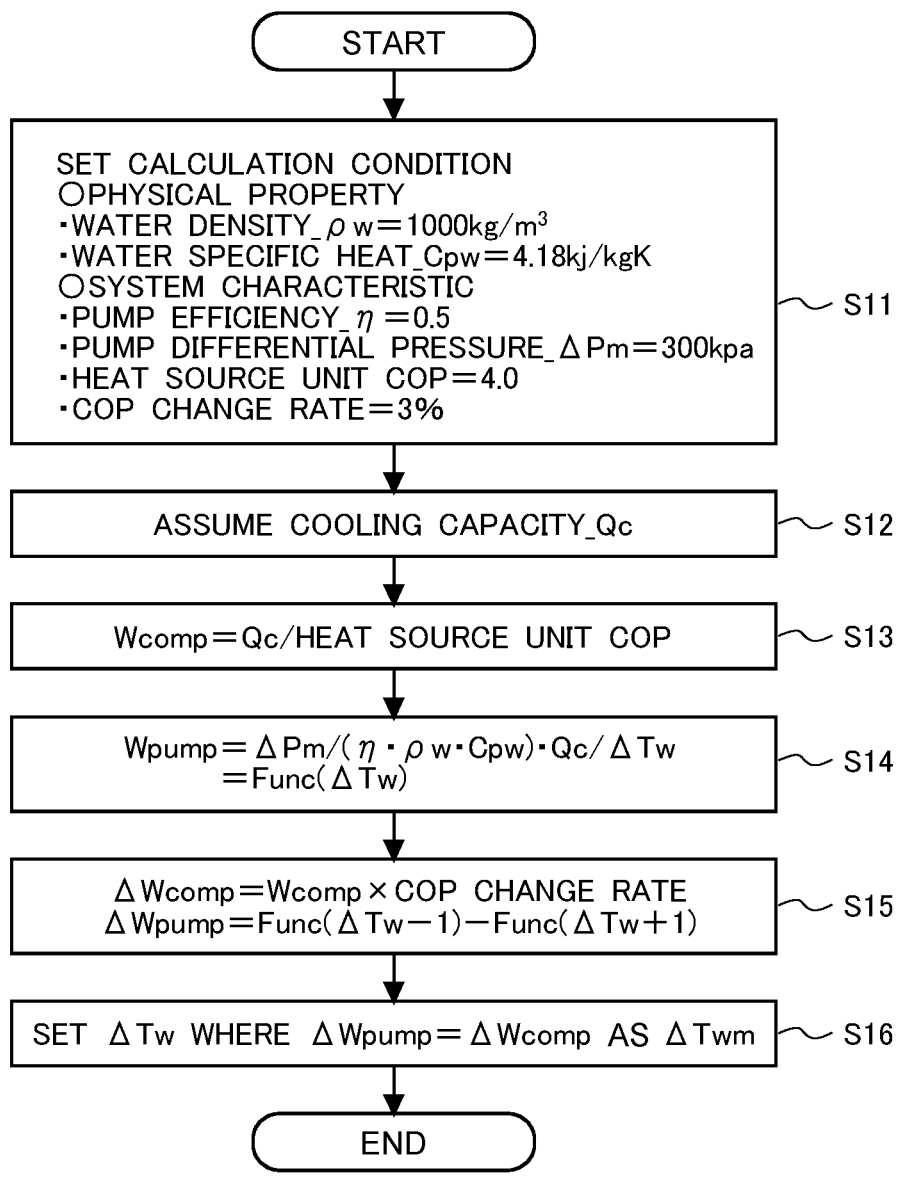
FIG. 17 is a diagram showing a calculation procedure for calculating a water temperature difference at which the total power consumption is minimized in an optimum water temperature difference calculation unit according to Embodiment 1.

FIG. 17 is a diagram showing a calculation procedure for obtaining the optimum water temperature difference ΔTwm at which the total power consumption is minimized in the optimum water temperature difference calculating unit 46 according to Embodiment 1. The optimum water temperature difference ΔTwm calculated here is delivered to the optimum water temperature difference setting unit 44 as a first threshold value. The optimum water temperature difference calculating unit 46 is not necessarily provided in the heat source unit controller 31, and the optimum water temperature difference ΔTwm calculated externally may be inputted to the optimum water temperature difference setting unit 44.

S11 is a step of reading information required for calculations, and device characteristics such as a density pw and a specific heat Cpw of water, an efficiency η of the pump 3 and a target differential pressure ΔPm set in the pump controller 33, a heat source unit COP and a COP change rate with respect to a change in the supply water temperature of 1° C. are set. S12 is a step of assuming a cooling capacity Qc, and an arbitrary value is set for the cooling capacity Qc. When the cooling capacity Qc is given, in S13 and S14, a power consumption Wcomp of the heat source unit 1 and a power consumption Wpump of the pump 3 are obtained by following Equations (1) and (2), respectively. The power consumption Wcomp of the heat source unit 1 calculated in S13 is a fixed value, while the power consumption Wpump of the pump 3 calculated in S14 is obtained as a function Func (ΔTw) because the water temperature difference ΔTw is an unknown value.

$$Wcomp = Qc/\text{heat source unit } COP \qquad (1)$$

$$Wpump = \Delta Pm/(\eta \cdot pw \cdot Cpw) \cdot Qc/\Delta Tw = Func(\Delta Tw) \qquad (2)$$

S15 is a step of calculating a change amount ΔWcomp of the power consumption Wcomp of the heat source unit 1 and a change amount ΔWpump of the power consumption of the pump 3 when the supply water temperature Tws changes by a unit amount such as 1° C. As shown in Equation (3) below, since the power consumption Wcomp of the heat source unit 1 is a fixed value, the change amount ΔWcomp of the power consumption of the heat source unit 1 is also a fixed value. On the other hand, since the power consumption Wpump of the pump 3 is a function of the water temperature difference ΔTw, the change amount ΔWpump of the power consumption of the pump 3 is also a function of the water temperature difference ΔTw as shown in Equation (4).

$$\Delta W\text{comp} = W\text{comp} \times \text{COP change rate} \quad (3)$$

$$\Delta W\text{pump} = \text{Func}(\Delta Tw-1) - \text{Func}(\Delta Tw+1) \quad (4)$$

S16 is a step of obtaining an optimum water temperature difference ΔTwm at which a total power consumption is minimized. In S16, a temperature difference ΔTw, at which the change amount ΔWpump of the power consumption of the pump 3 calculated for each water temperature difference ΔTw and the change amount ΔWcomp of the power consumption of the heat source unit 1 which is a constant value are coincident, is searched for and set as the optimum water temperature difference ΔTwm. According to values of heat source unit COP=4.0, COP change rate=3%, ΔPm=300 kPa, and pump efficiency η=0.5 as shown in FIG. 17, the optimum water temperature difference ΔTwm is about 7.5° C. regardless of the cooling capacity Qc.

Figure 18:
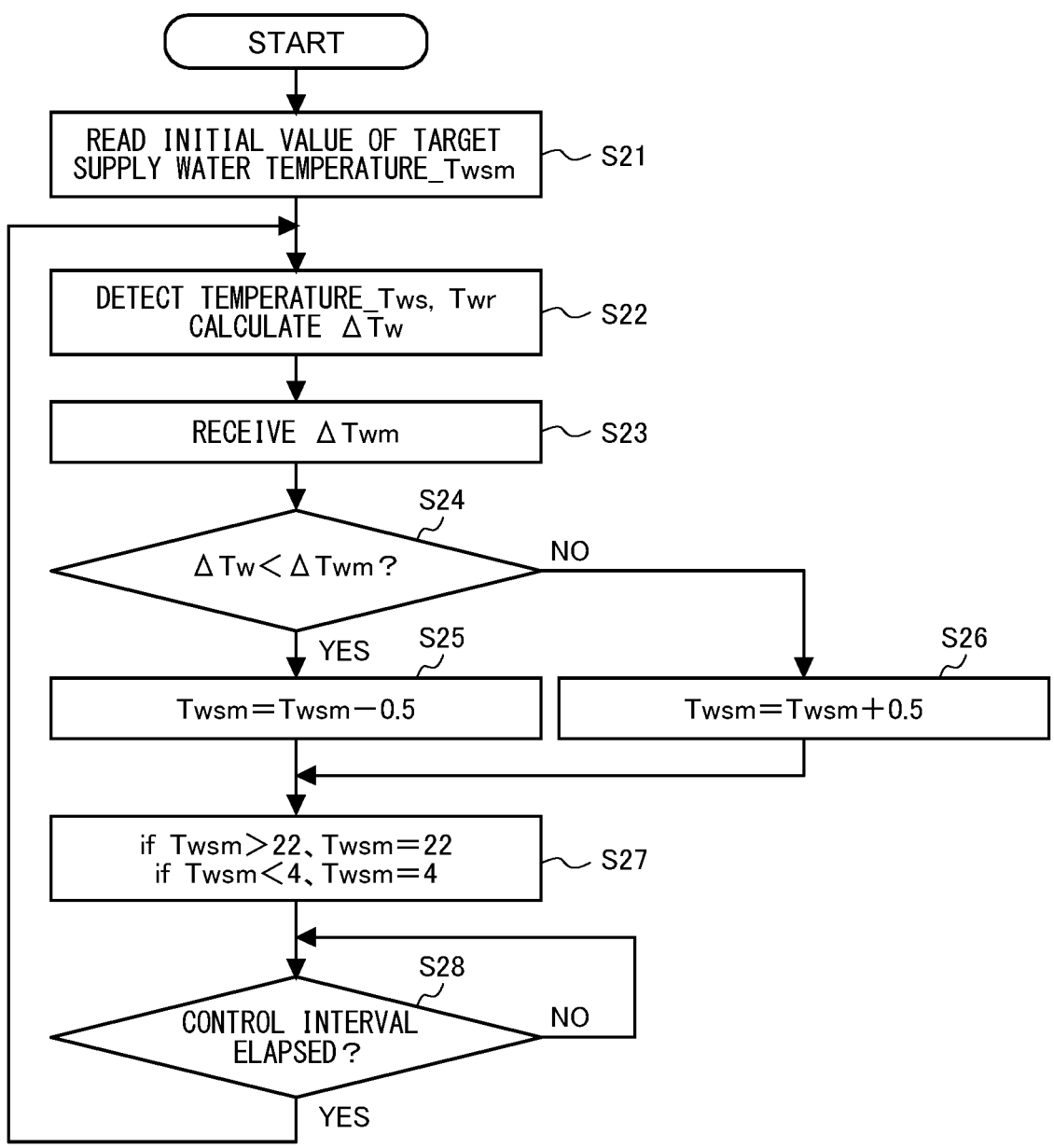
FIG. 18 is a flowchart showing a control operation of a target supply water temperature updating unit of the air conditioning system according to Embodiment 1.

FIG. 18 is a flowchart showing a control operation of the target supply water temperature updating unit 43. The target supply water temperature updating unit 43 has an initial value of a target supply water temperature Twsm, and reads the initial value as the target supply water temperature Twsm at the time of starting the operation of the air conditioning system 100 (S21). S22 is a step of acquiring a temperature information from the supply water temperature sensor 14 and the return water temperature sensor 23 to calculate a water temperature difference ΔTw. S23 is a step of receiving the optimum water temperature difference ΔTwm from the optimum water temperature difference setting unit 44 described later. In S24, a present water temperature difference ΔTw is compared with the optimum water temperature difference ΔTwm. When the present water temperature difference ΔTw is smaller than the optimum water temperature difference ΔTwm (S24: YES), the target supply water temperature Twsm is decreased by 0.5° C. (S25). On the other hand, when the present water temperature difference ΔTw is equal to or larger than the optimum water temperature difference ΔTwm (S24: NO), the target supply water temperature Twsm is increased by 0.5° C. (S26). S27 is a step of setting an upper limit value 22° C. and a lower limit value 4° C. to the target supply water temperature Twsm to prevent the target supply water temperature Twsm from exceeding 4° C. to 22° C. The above-described steps are repeated at a control interval of, for example, 1 minute (S28).

In the Embodiment 1, the target supply water temperature Twsm is decreased or increased so that the water temperature difference ΔTw coincides with the optimum water temperature difference ΔTwm. However, an effect that the total power consumption is reduced can be obtained by only one of the steps S25, which is a step of decreasing the target supply water temperature Twsm when the water temperature difference ΔTw is larger than the optimum water temperature difference ΔTwm, and S26, which is a step of increasing the target supply water temperature Twsm when the water temperature difference ΔTw is equal to or smaller than the optimum water temperature difference ΔTwm.

Figure 19:
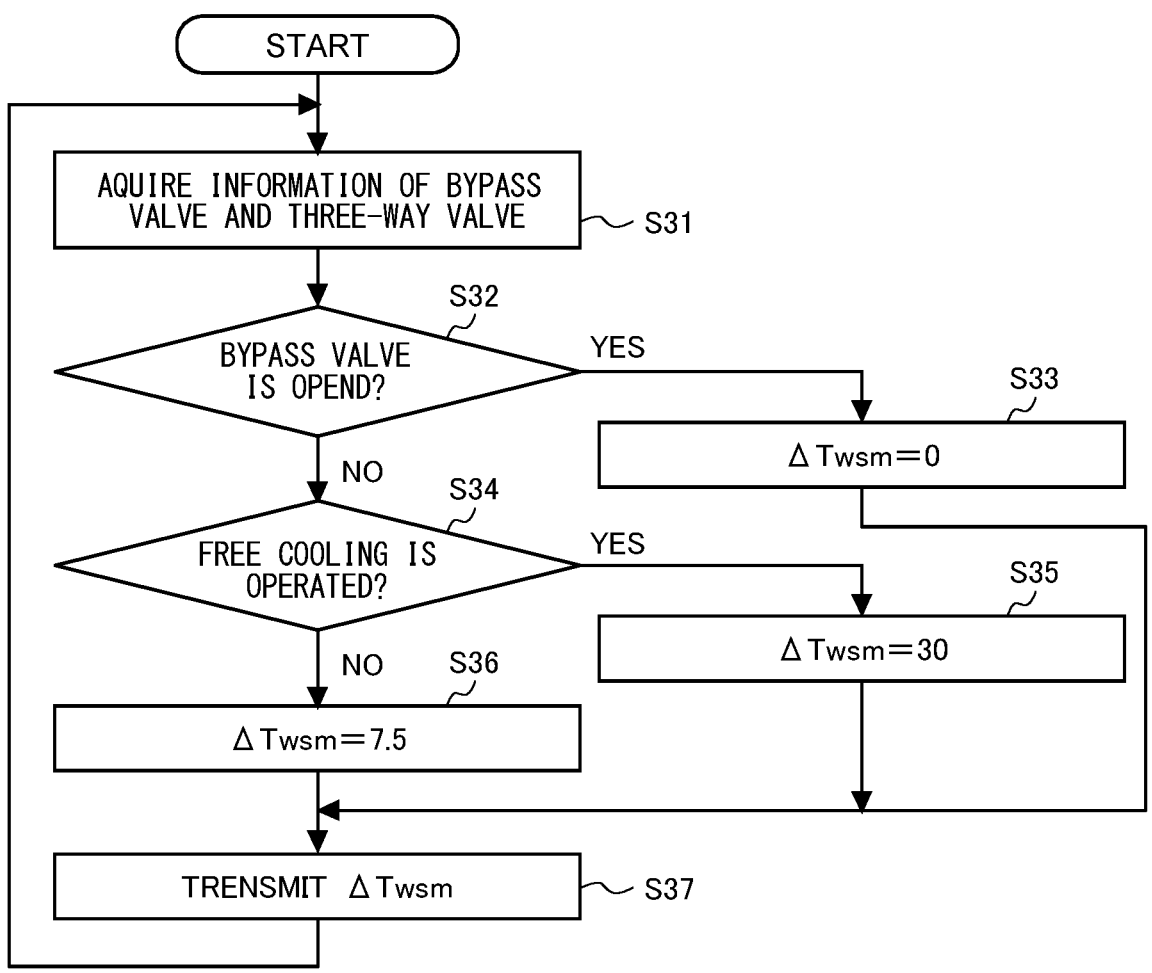
FIG. 19 is a flowchart showing a control operation of an optimum water temperature difference setting unit of the air conditioning system according to Embodiment 1.

FIG. 19 is a flowchart showing a control operation of the optimum water temperature difference setting unit 44. S31 is a step of acquiring operating states of the bypass valve 19 and the three-way valve 22. When the bypass valve 19 is opened (S32: YES), the optimum water temperature difference ΔTwm is set to a third threshold value of 0° C. (S33). The third threshold value is smaller than the first threshold value. When the bypass valve 19 is closed (S32: NO) and the water flows through the free cooling circuit 20 (S34: YES), the optimum water temperature difference ΔTwm is set to a second threshold value of 30° C. (S35). The second threshold value is larger than the first threshold value. When the bypass valve 19 is closed (S32: NO) and the water flows through the free cooling circuit 20 (S34: NO), the optimum water temperature difference ΔTwm is set to the first threshold value of 7.5° C. (S36). Then, the optimum water temperature difference ΔTwm is transmitted to the target supply water temperature updating unit 43 (S37). By setting the optimum water temperature difference ΔTwm by the optimum water temperature difference setting unit 44 as described above, the target supply water temperature updating unit 43 can update the target supply water temperature Twsm only based on a relation between the optimum water temperature difference ΔTwm and the water temperature difference ΔTw regardless of operating conditions of the water circuit.

As described above, in the air conditioning system 100 according to the Embodiment 1 of the present disclosure, the total power consumption of the heat source unit 1 and the pump 3 can be minimized by a simple calculation process of determining the target supply water temperature Twsm based on the water temperature difference ΔTw between the inlet and the outlet of the heat source unit 1, so that the air conditioning system can suppress increase in cost of the system.

Embodiment 2

Figure 20:
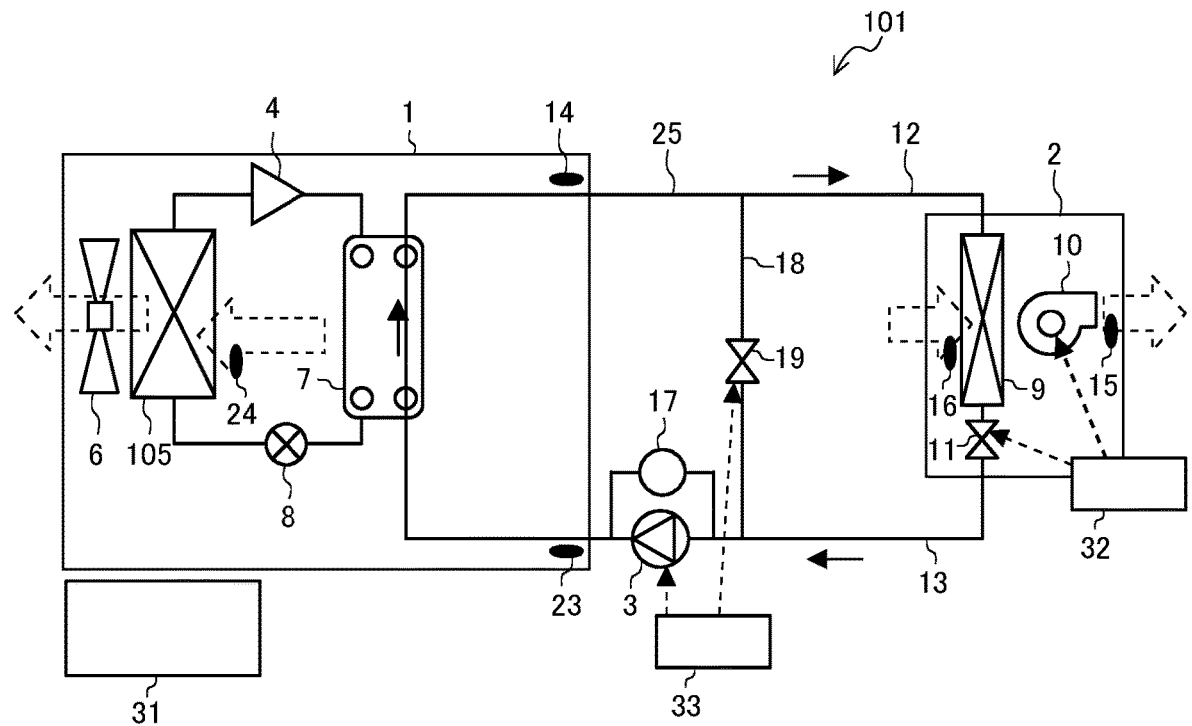
FIG. 20 is a schematic diagram of an air conditioning system according to Embodiment 2.

FIG. 20 is a schematic diagram of an air conditioning system 101 according to Embodiment 2. The air conditioning system 101 performs a heating operation, and the heat source unit 1 is capable of adjusting a heating capacity for generating hot water. The heat source unit 1 includes a refrigeration cycle in which a compressor 4, a refrigerant-water heat exchanger 7 functioning as a condenser, an expansion valve 8, and a refrigerant-air heat exchanger 105 functioning as an evaporator are connected in sequence. The other configurations are the same as those of Embodiment 1.

In FIG. 20, the hot water heated by the refrigerant-water heat exchanger 7 is supplied to the indoor unit 2 by the pump 3. The indoor unit 2 performs a heating operation by exchanging heat between the inflowing hot water and the indoor air in the indoor heat exchanger 9. The relation between the power consumption Wpump of the pump 3, the power consumption Wcomp of the heat source unit 1 and the supply water temperature Tws at this time is the same as that in Embodiment 1.

In Embodiment 2, the target supply water temperature updating unit 43 increases the target supply water temperature Twsm when the water temperature difference ΔTw is smaller than the optimum water temperature difference ΔTwm (i.e., the first threshold value), and decrease the target supply water temperature Twsm when the water temperature difference ΔTw is equal to or larger than the optimum water temperature difference ΔTwm. When the bypass passage 18 is opened, the target supply water temperature updating unit 43 decreases the target supply water temperature Twsm when the water temperature difference ΔTw is larger than a third threshold value (i.e., 0° C.) which is smaller than the first threshold value (i.e., 7.5° C.).

For example, when the present target supply water temperature Twsm is 45° C. and updated to 46° C., the change amount ΔWcomp of the power consumption of the heat source unit 1 increases by a change amount of COP of the power consumption Wcomp of the heat source unit 1 calculated by Equation (1). Also, the change amount ΔWpump of the power consumption of the pump 3 can be calculated for each ΔTw by using Equation (2) and Equation (4) as they are. Also in the heating operation, the optimum water temperature difference ΔTwm at which the total power consumption of the pump 3 and the heat source unit 1 is minimized is 7.5° C., which is the same as that in Embodiment 1.

As described above, the air conditioning system 101 according to the second embodiment of the present disclosure can minimize the total power consumed by the heat source unit 1 and the pump 3 by a simple calculation process of determining the target supply water temperature based on the water temperature difference between the inlet and the outlet of the heat source unit 1 even when the air conditioning system 101 performs the heating operation. Therefore, a high-performance calculation unit is not required for the calculation operation of the air conditioning system 101, so that the air conditioning system 101 can suppress increase in cost of the system.

Embodiment 3

Figure 21:
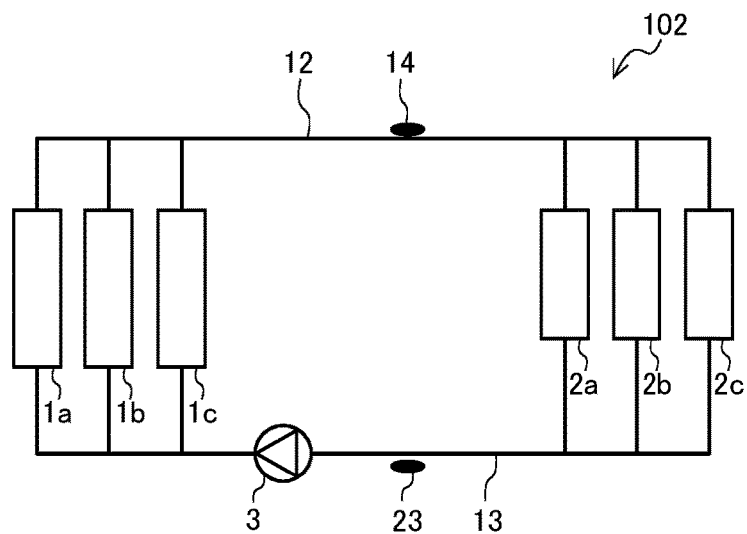
FIG. 21 is a schematic diagram of an air conditioning system according to Embodiment 3.

FIG. 21 is a schematic diagram of an air conditioning system 102 according to Embodiment 3. The air conditioning system 102 is configured by including a plurality of the heat source units 1 and a plurality of the indoor units 2 connected to the supply pipe 12 and the return pipe 13 in the air conditioning system 100 or 101 according to Embodiment 1 or Embodiment 2. The plurality of heat source units 1a, 1b and 1c are connected in parallel to the supply pipe 12 and the return pipe 13. The plurality of indoor units 2a, 2b and 2c are also connected in parallel to the supply pipe 12 and the return pipe 13. The heat source unit controller 31 is provided in each of the plurality of heat source units 1a, 1b and 1c, and the compressor 4 and the three-way valve 22 are individually controlled. Each indoor unit 2a, 2b and 2c is also provided with the indoor unit controller 32 for individual control.

As described above, in the air conditioning systems 100 and 101 which include a plurality of heat source units 1 and a plurality of indoor units 2 as the air conditioning system 102 according to Embodiment 3 of the present disclosure, the total power consumption of the heat source units 1a, 1b, and 1c and the pump 3 can be minimized by a simple calculation process of determining the target supply water temperature based on the water temperature difference between the inlet and the outlet of the heat source units 1a, 1b and 1c. Therefore, the air conditioning system 102 does not require a high-performance calculation device for the calculation, so that the air conditioning system 102 can suppress increase in cost of the system.

Embodiment 4

Figure 22:
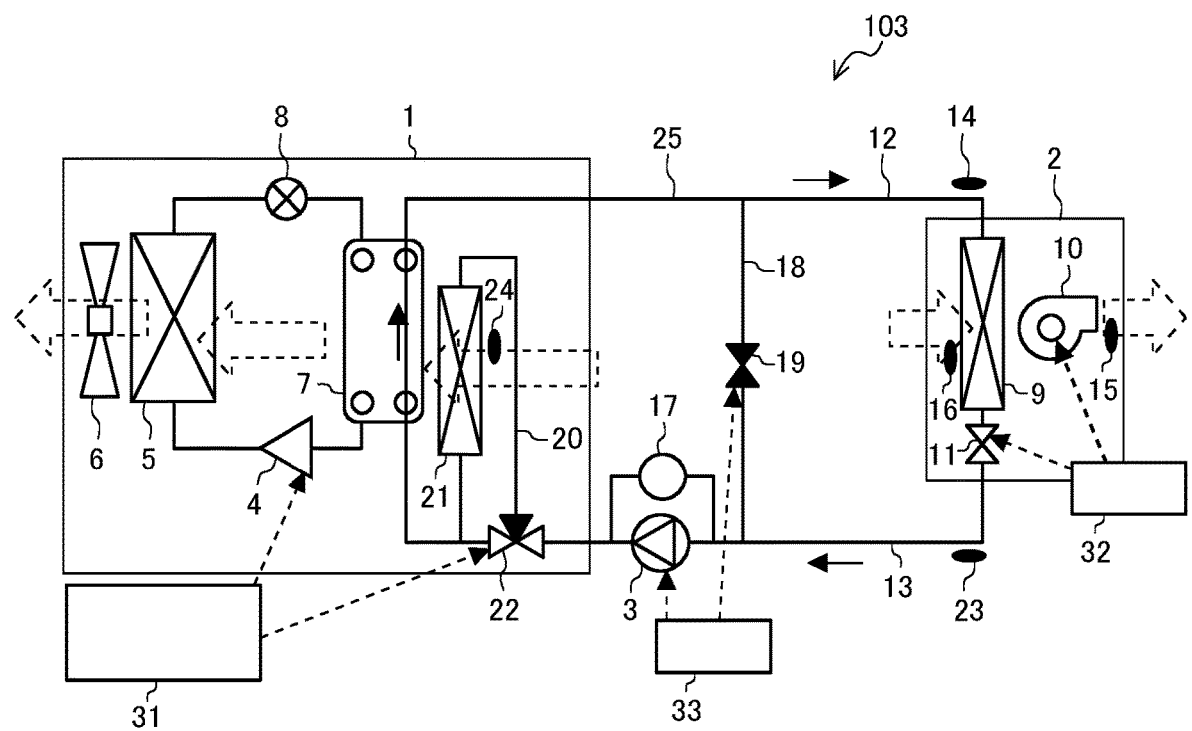
FIG. 22 is a schematic diagram of an air conditioning system according to Embodiment 4.

FIG. 22 is a schematic diagram of an air conditioning system 103 according to Embodiment 4. In the air conditioning system 103, the supply water temperature sensor 14 and the return water temperature sensor 23 are not included in the heat source unit 1. The supply water temperature sensor 14 is installed on an inlet side of the indoor unit 2, and the return water temperature sensor 23 is installed on an outlet side of the indoor unit 2. In the water circuits 25 in Embodiments 1 to 4, a temperature of the cold water changes only before and after the heat source unit 1 or before and after the indoor unit 2, except for a slight temperature change due to heat absorption and radiation losses from water pipes. Thus, the supply water temperature sensor 14 may be installed anywhere in the supply pipe 12 extending from the heat source unit 1 to the indoor unit 2, and the return water temperature sensor 23 may be installed anywhere in the return pipe 13.

As described above, in the air conditioning system 103 according to Embodiment 4 of the present disclosure, the total power consumption of the heat source unit 1 and the pump 3 can be minimized by the simple calculation processing for determining the target supply water temperature based on the water temperature difference between the inlet and the outlet of the indoor unit 2. Therefore, the air conditioning system 103 does not require a high-performance calculation unit for the calculation processing, so that the air conditioning system 103 can suppress increase in cost of the system.

Note that the configurations shown in the above embodiments are examples of the content of the present invention, and can be combined with another known technology, and a part of the configurations can be omitted or changed without departing from the gist of the present invention.

REFERENCE SIGNS LIST 1 heat source unit 2 indoor unit 4 compressor 5 condenser 6 outdoor fan 7 refrigerant-water heat exchanger 8 expansion valve 9 indoor heat exchanger 10 indoor fan 11 two-way valve 12 supply pipe 13 return pipe 14 supply water temperature sensor 15 supply air temperature sensor 16 return air temperature sensor 17 differential pressure sensor 18 bypass passage 19 bypass valve 20 free cooling circuit 21 water-air heat exchanger 22 three-way valve 23 return water temperature sensor 24 outside air temperature sensor 25 water circuit 31 heat source unit controller 32 indoor unit controller 33 pump controller 41 information reading unit 42 three-way valve control unit 43 target supply water temperature updating unit 44 optimum water temperature difference setting unit 45 supply water temperature control unit 46 optimum water temperature difference calculating unit 100, 101, 102, 103 air conditioning system

The invention claimed is:
1. An air conditioning system, comprising:
a heat source unit capable of adjusting a cooling capacity or a heating capacity for generating cold or hot water;
an indoor unit configured to exchange heat between sucked air and the cold or hot water and blow out the air;
a water circuit configured by connecting a supply pipe and a return pipe so that the cold or hot water circulates to the heat source unit and the indoor unit;
a flow rate adjusting valve provided in the water circuit and capable of adjusting a flow rate of the cold or hot water;
an indoor unit controller configured to adjust a flow rate of the flow rate adjusting valve;
a pump provided in the water circuit, of which rotation speed is adjustable;
a pump controller configured to control the rotation speed of the pump;

a return water temperature sensor configured to detect a temperature of the cold or hot water flowing through the return pipe;
a supply water temperature sensor configured to detect a temperature of the cold or hot water flowing through the supply pipe; and
a heat source unit controller configured to
adjust the cooling capacity or the heating capacity of the heat source unit so that the supply water temperature detected by the supply water temperature sensor becomes a target supply water temperature, and
change the target supply water temperature based on a temperature difference between the return water temperature detected by the return water temperature sensor and the supply water temperature,
wherein, when the heat source unit cools the cold or hot water, the heat source unit controller is configured to decrease the target supply water temperature when the temperature difference between the return water temperature and the supply water temperature is smaller than a preset first threshold value,
wherein the heat source unit comprises:
a water-air heat exchanger provided in series with the water circuit so that the cold or hot water flowing from the return pipe flows to the water-air heat exchanger; and
a flow path switching device configured to close an inlet side of the water-air heat exchanger and divert the cold or hot water flowing from the return pipe to an outlet side of the water-air heat exchanger, and
wherein, when the heat source unit cools the cold or hot water, the heat source unit controller is configured to decrease the target supply water temperature when the temperature difference is smaller than a second threshold value larger than the first threshold value when the cold or hot water flows through the water-air heat exchanger.

2. An air conditioning system, comprising:
a heat source unit capable of adjusting a cooling capacity or a heating capacity for generating cold or hot water;
an indoor unit configured to exchange heat between sucked air and the cold or hot water and blow out the air;
a water circuit configured by connecting a supply pipe and a return pipe so that the cold or hot water circulates to the heat source unit and the indoor unit;
a flow rate adjusting valve provided in the water circuit and capable of adjusting a flow rate of the cold or hot water;
an indoor unit controller configured to adjust a flow rate of the flow rate adjusting valve;
a pump provided in the water circuit, of which rotation speed is adjustable;
a pump controller configured to control the rotation speed of the pump;
a return water temperature sensor configured to detect a temperature of the cold or hot water flowing through the return pipe;
a supply water temperature sensor configured to detect a temperature of the cold or hot water flowing through the supply pipe; and
a heat source unit controller configured to
adjust the cooling capacity or the heating capacity of the heat source unit so that the supply water temperature detected by the supply water temperature sensor becomes a target supply water temperature, and
change the target supply water temperature based on a temperature difference between the return water temperature detected by the return water temperature sensor and the supply water temperature,
wherein, when the heat source unit cools the cold or hot water, the heat source unit controller is configured to decrease the target supply water temperature when the temperature difference between the return water temperature and the supply water temperature is smaller than a preset first threshold value,
wherein the water circuit includes:
a bypass passage having one end connected to the supply pipe and the other end connected to the return pipe on the inlet side of the pump; and
a bypass valve configured to open or close the bypass passage, and
wherein, when the bypass passage is opened, the heat source unit controller is configured to increase the target supply water temperature when the temperature difference is larger than a third threshold value smaller than the first threshold value.

* * * * *